Feb. 23, 1954  C. E. DEARDORFF ET AL  2,670,004
COMBINATION MASTER CYLINDER AND POWER BRAKE VALVE
Filed April 28, 1952
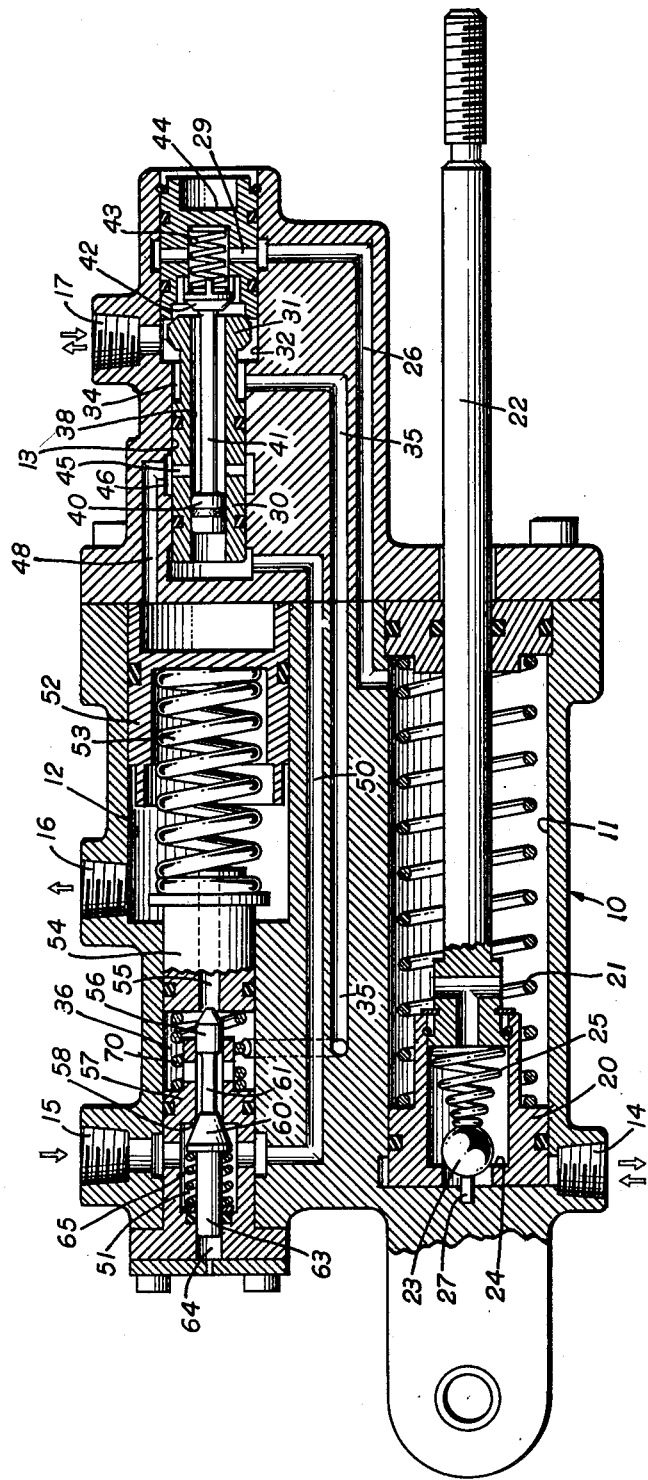
C. E. Deardorff
N. J. Bifano
W. E. Elder
    INVENTORS
BY *[signature]*
ATTORNEY Patented Feb. 23, 1954

2,670,004

UNITED STATES PATENT OFFICE 2,670,004

COMBINATION MASTER CYLINDER AND POWER BRAKE VALVE

Clinton E. Deardorff, Sepulveda, William E. Elder, Sherman Oaks, and Natale J. Bifano, Los Angeles, Calif., assignors to Bendix Aviation Corporation, North Hollywood, Calif., a corporation of Delaware Application April 28, 1952, Serial No. 284,834

3 Claims. (Cl. 137—113)

This invention relates to hydraulic brake systems and more particularly to the master cylinder end thereof which applies or controls the application of pressure fluid to the brake lines. More specifically, the invention relates to that type of master cylinder and valve assembly that normally acts as a power brake valve to control the application of fluid from a pump or other separate pressure source to the brakes, but which, in event of failure of the separate pressure source, automatically acts as a master cylinder to supply pressure fluid directly to the brakes.

An object of the invention is to provide an assembly of the type described that is relatively simple and practicable to manufacture and has little leakage.

Other more specific objects and features of the invention will be apparent from the description to follow with reference to the drawing.

The single figure of the drawing is a longitudinal sectional view through an assembly, in accordance with the invention.

Referring to the drawing, the unit therein disclosed comprises a body 10 which defines a master brake cylinder 11, a control cylinder 12 and a transfer valve cylinder 13. The master cylinder 11 has a fluid inlet port 14 adapted to be connected to a fluid reservoir. The body 10 is additionally provided with a pressure port 15, a return port 16, and a brake port 17. The pressure port 15 may be supplied with fluid by a pump which draws fluid from the same reservoir to which port 14 is connected. The return port 16 may return to the same reservoir. The brake port 17 is connected to the brake line leading to the brakes to be actuated.

The master cylinder 11 contains a piston 20 which is normally maintained in leftmost position by a helical compression spring 21 but can be shifted to the right against the force exerted by the spring 21, by a piston rod 22 which extends through a sealed aperture in the right end of the cylinder 11 to the exterior. The piston 20 contains a check valve in the form of a ball 23 urged against a seat 24 by a spring 25. During rightward movement of the piston 20 the ball 23 seats against the seat 24 to prevent flow of fluid through the piston so that fluid is displaced from the right end of the cylinder 11 through a control passage 26, and fresh fluid is drawn in through the port 14. When the piston 20 is returned to the left, the check valve 23 may open to permit entry of fluid into the right end of the cylinder 11. When the piston 20 is in its position of rest in the left end of the cylinder 11, as shown, the ball 23 is held off its seat by a stop 27 projecting from the left end wall of the cylinder 11. This insures that all pressure will be relieved in the cylinder 11 and the control passage 26 when the master piston 20 is in its position of rest.

Fluid delivered from the master cylinder 11 through the control passage 26 enters the right end of the transfer valve cylinder 13 through a control port 29. This transfer valve cylinder 13 contains a sleeve piston 30 which is reciprocable in the cylinder and has formed on its right end a poppet head 31 which is positioned in an annular groove 32 in the cylinder 13. The piston sleeve 30 is reciprocable between a rightmost position, as shown, in which the poppet 31 seats against the right edge of the annular groove 32; into a leftmost position in which the poppet 31 seals against the left edge of the recess 32. It will be observed that the recess 32 is directly connected to the brake port 17. The surface of the piston 30 is recessed, to the left of the poppet 31, to define with the cylinder 13 an annular recess 34 which is connected by a delivery passage 35 to a valve cylinder 36 which constitutes a part of the power brake valve portion of the complete assembly. The cylindrical bore 38 of the piston sleeve 30 contains a piston 40 which is connected by a stem 41 to a poppet 42 which is adapted to reciprocate into and out of engagement with the right end of the sleeve piston 30. The piston and poppet assembly is urged to the left by a helical compression spring 43 compressed between the poppet 42 and an end cap 44 for the cylinder 13. The portion of the sleeve piston bore 38 to the right of the piston 40 is communicated by ports 45 with an annular recess 46 in the cylinder 13 which is connected by a control passage 48 with the right end of the control cylinder 12. The left end of the transfer valve cylinder 13 is connected by a passage 50 to a pressure chamber 51 which is in turn connected to the pressure port 15.

It will be observed that whatever pressure exists in the pressure port 15 is applied at all times through the pressure passage 50 to the left end of the piston sleeve 30 and the left end of the piston 40. This pressure is normally greater than the pressure present in the control port 29 which acts against the right end of the piston sleeve 30 and the piston 40. Hence the piston sleeve 30 is normally in its rightmost position in which the poppet 31 seals against the right edge of the annular groove 32, and the piston 40 is in its rightmost position in which the poppet 42 is opened away from the right end of the piston sleeve 30. When the master piston rod 22 is reciprocated to pump fluid through the passage 26 this fluid is free to flow past the poppet 42 and through the bore 38 of the piston sleeve and through the ports 45 and the passage 48 into the right end of the control cylinder 12. At the same time, the brake port 17 is connected through the delivery passage 35 to the cylinder 36.

The control cylinder 12 contains a control piston 52 which is coupled by a compression spring 53 with a plunger 54 which is reciprocable in the cylinder 36 and has an axial fluid passage 55 extending therethrough which passage is adapted to be closed by a poppet valve 56. The left end of the cylinder 36 is closed by a closure member 57 defining at its left end a valve seat 58 communicating with the pressure chamber 51. A poppet 60 is adapted to seat against the seat 58 and is connected by a stem 61 to the poppet 56. A stem 63 extends from the left end of the poppet 60 into a guide passage 64. A helical compression spring 65 compressed between the poppet 60 and the closure member urges the poppet 60 against its seat 58 to normally disconnect the pressure chamber 51 from the cylinder 36.

The plunger 54 is normally urged to the right by a helical compression spring 70 into a position in which the poppet 56 is clear of the bore 55, so that the cylinder 36 is connected to the control cylinder 12, which in turn is permanently connected to the return port 16. When pressure fluid is admitted to the right end of the control cylinder 12, it urges the control piston 52 therein to the left, which compresses the spring 53 and moves the plunger 54 to the left until it engages against and seals with the poppet 56 thereby disconnecting the cylinder 36 from the return port 16. Further leftward movement of the plunger 54 carries the poppet 56 with it and moves the poppet 60 clear of the seat 58 to admit pressure fluid from the pressure port 15 past the poppet 60 into the cylinder 36 and thence through the delivery passage 35.

The system disclosed operates as follows:

As previously indicated, actuation of the master cylinder piston rod 22 delivers fluid through the control passage 26 and the control port 29 into the right end of the transfer valve cylinder 13 from whence it flows past the poppet 42 and through the sleeve piston bore 38, the ports 45, and the passage 48 into the right end of the control cylinder 12. This moves the control piston 52 to the left, to cut off the cylinder 36 from the return port 16 and connect it to the pressure port 15 to admit pressure fluid through the passage 35 and the annular recess 34 to the brake port 17 to actuate the brakes.

Now let it be assumed that the pump applying pressure fluid to the port 15 has failed and that the pressure in the port 15 drops to a low value relative to the pressure developed in the master cylinder 11 when the piston 20 therein is moved to the right. The force of the spring 43 and the pressure force of the fluid from the master cylinder acting on the right end of the sleeve piston 30 and the piston 40 is no longer opposed by the high pressure formerly existent in the left end of the transfer valve cylinder 13. Hence, the sleeve piston 30 moves to the left until the poppet 31 seats against the left edge of the groove 32, and the piston 40 moves to the left until the poppet 42 seats against the right end of the sleeve piston 30. The closure of poppet 42 against the right end of the sleeve piston 30 breaks communication between the control port 29 and the right end of the control cylinder 12 so that fluid can no longer flow from the master cylinder 11 to the control cylinder 12. The shifting of the poppet 31 from engagement with the right edge of the groove 32 to engagement with the left edge thereof disconnects the delivery passage 35 from the brake port 17 and connects the control port 29 to the brake port 17. Thereafter all fluid delivered from the master cylinder through the passage 26 flows directly through the brake port 17 and through the brake line to the brakes, so that the device functions as an ordinary master cylinder instead of as a power brake valve.

Although for the purpose of explaining the invention, a particular embodiment thereof has been shown and described, obvious modifications will occur to a person skilled in the art, and I do not desire to be limited to the exact details shown and described.

We claim:

1. In combination: a power brake valve having a power pressure port, a delivery passage, an exhaust port, a control passage, a control motor connected to said control passage, valve means actuated by said control motor in response to a varying pressure in said control passage for selectively connecting said delivery passage to said pressure port or to said exhaust port; a control port and a brake port; and pressure responsive transfer valve means differentially responsive to pressures in said pressure and said control ports respectively for connecting said control port to said control passage and said brake port to said delivery passage when the pressure port pressure exceeds the control port pressure, and disconnecting said delivery passage from said brake port and said control passage from said control port and connecting said control port directly to said brake port when the control port pressure exceeds the pressure port pressure.

2. The combination of claim 1 in which said transfer valve means comprises: a cylinder connected at one end to said control port and at the other end to said pressure port and having an annular groove adjacent said one end connected to said brake port; a sleeve piston in said cylinder having a double faced annular poppet head on its one end positioned in said annular groove and reciprocable to seat adjacent one or the other edge of said annular groove; a piston reciprocable in said sleeve piston adjacent the other end thereof, and a poppet connected to said piston for reciprocation therewith against and away from said one end of said sleeve piston; said cylinder and sleeve piston defining an annular recess on the pressure port side of said groove and connected to said delivery passage; and ports in said cylinder and sleeve piston communicating said control passage with the interior of said sleeve piston intermediate the piston therein and said one end.

3. The combination of claim 2 including spring means urging said poppet against said one end of said sleeve piston.

CLINTON E. DEARDORFF.
WILLIAM E. ELDER.
NATALE J. BIFANO.

References Cited in the file of this patent

UNITED STATES PATENTS

| Number | Name | Date |
|---|---|---|
| 2,472,695 | Chouings | June 7, 1949 |
| 2,501,941 | Hallerith | Mar. 28, 1950 |
| 2,569,028 | Stryker | Sept. 25, 1951 |